March 31, 1970   W. T. LEMEN   3,504,285
TRANSISTOR PROTECTIVE CIRCUIT
Filed March 22, 1968

INVENTOR.
William T. Lemen
BY
Hugh L. Fisher
ATTORNEY

3,504,285
TRANSISTOR PROTECTIVE CIRCUIT
William T. Lemen, Frankfort, Ind., assignor to General Motors Corporation, Detroit, Mich., a corporation of Delaware
Filed Mar. 22, 1968, Ser. No. 715,431
Int. Cl. G01r *31/22*
U.S. Cl. 324—158                                    6 Claims

ABSTRACT OF THE DISCLOSURE

A transistor test circuit incorporating a circuit for protecting the test transistor from damage due to thermal runaway by limiting the rate of increase in the reverse base current of the test transistor so as to permit a conventional circuit breaker to operate and terminate the thermal runaway before the test transistor is damaged. The protective circuit includes an auxiliary transistor that provides an impedance which increases as the reverse base current of the test transistor increases.

---

This invention relates to a transistor circuit, and more particularly to a circuit for protecting a transistor from damage due to thermal runaway.

When a transistor is operated at high ambient temperatures or under high power dissipation conditions, it is possible for thermal runaway to occur. Thermal runaway is a well known transistor phenomenon wherein at a critical junction temperature the transistor undergoes regenerative heating and may ultimately be destroyed. At the critical junction temperature, the current through the transistor rapidly increases thereby increasing the temperature of the transistor which in turn increases the current through the transistor and so on until the transistor is severely damaged or destroyed. The thermal runaway phenomenon takes place so rapidly that a conventional fuse or other current responsive circuit breaker does not operate fast enough to prevent damage to the transistor. Previous attempts to provide a circuit for protecting a transistor from thermal runaway have largely proved unsatisfactory because the protective devices used have usually had an adverse effect on the normal operation of the transistor.

One area in which thermal runaway poses a particularly serious problem is in the testing of transistors. Excluding operator error and equipment mulfunction, the major cause of thermal runaway during transistor testing is the improper fabrication of the test transistor. However, once the transistor is destroyed it is impossible to examine it in order to diagnose the exact defect which caused it to fail so that proper corrective action may be taken to remedy the defect in the future. This inability to adequately inspect the defective transistor seriously hampers effective quality control.

Accordingly, it is a principal object of this invention to provide a circuit for protecting a transistor from damage due to thermal runaway by restricting the rate of increase in the reverse base current of the transistor so as to retard the rate of thermal runaway and permit a current responsive circuit breaker to operate before the transistor is damaged. It is another object of this invention to provide a circuit for protecting a transistor from damage due to thermal runaway wherein the protective circuit may be incorporated within another transistor circuit without affecting the normal operation of the other transistor circuit. It is a further object of this invention to provide a transistor test circuit incorporating a circuit for protecting the test transistor from damage due to thermal runaway so that the test transistor may be inspected in order to ascertain the precise defect which caused it to fail in thermal runaway.

In order to accomplish these and other objects, a preferred embodiment of the invention provides a transistor test circuit for protecting the test transistor from damage due to thermal runaway. The inventive circuit comprises a fuse coupled to one of the emitter, base, and collector electrodes of the test transistor and an auxiliary transistor coupled to the base electrode of the test transistor. The fuse is responsive to the increase in the electrode current caused by the thermal runaway of the test transistor so as to open the electrode circuit thereby terminating the thermal runaway. The auxiliary transistor is responsive to the increase in the reverse base current caused by the thermal runaway of the test transistor so as to provide an impedance which increases as the reverse base current increases. The impedance of the auxiliary transistor thereby restricts the rate of increase in the reverse base current so as to retard the rate of thermal runaway and permit the fuse to open before the transistor is damaged.

The invention may be best understood by reference to the following detailed description of a preferred embodiment when considered in conjunction with the accompanying drawing, in which.

Figure 1:
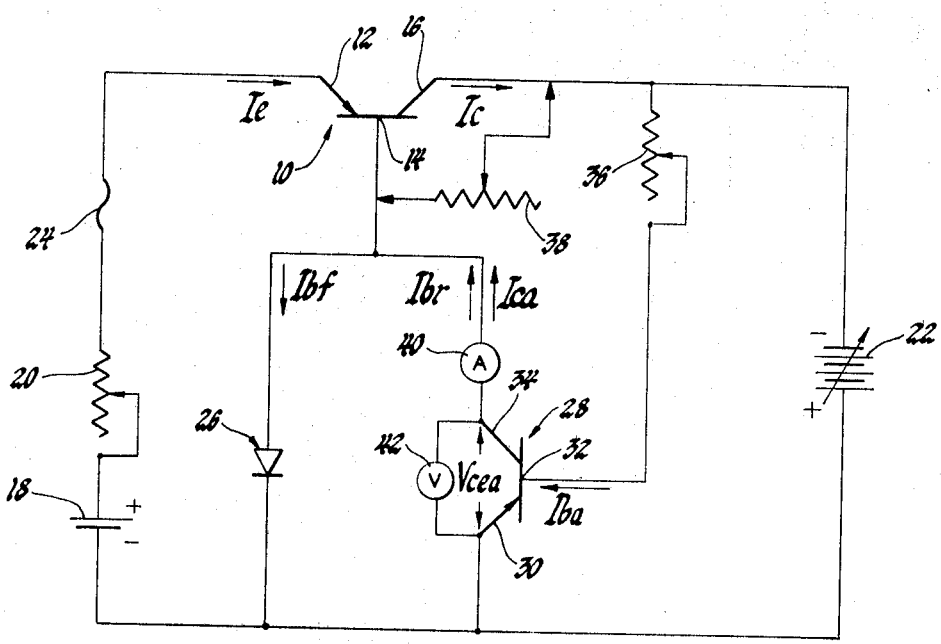
FIGURE 1 is a schematic diagram of a typical transistor test circuit incorporating the principles of the invention.

With reference to FIGURE 1, a basic direct coupled transistor circuit is illustrated. This circuit may be used in conducting various transistor tests including a transistor life test. The circuit includes a test transistor 10 having an emitter electrode 12, a base electrode 14, and a collector electrode 16. Although the test transistor 10 is of the NPN type, a transistor of the PNP type could also be used. A current supply including a fixed voltage source 18 and a variable resistor 20, is coupled to the emitter electrode 12 for supplying emitter current $I_e$ to the test transistor 10. A voltage supply comprising a variable voltage source 22 is coupled to the collector electrode 16 for supplying collector voltage to the test transistor 10 so as to draw collector current $I_c$. A circuit breaker for interrupting the flow of emitter current $I_e$ to the test transistor 10 when the emitter current $I_e$ becomes excessive is provided by an emitter fuse 24. A variable impedance device is provided by an auxiliary transistor 28 coupled to the base electrode 14 of the test transistor 10. The auxiliary transistor 28 includes an emitter electrode 30, base electrode 32, and a collector electrode 34. While the auxiliary transistor 28 is of the NPN type, a PNP type transistor may also be employed. The base electrode 32 of the auxiliary transistor 28 is connected to the negative side of the collector voltage supply 22 through a variable biasing resistor 36. However, the base electrode 32 of the auxiliary transistor 28 could also be connected to a separate voltage source. A unidirectionally conducting circuit element for bypassing the auxiliary transistor 28 is provided by a diode 26. Another variable resistor 38 is used for setup purposes only and is not a permanent part of the test circuit.

In order to properly test the test transistor 10, it is necessary that the transistor 10 be operated in both a forward base current condition wherein the base current flows in a forward direction out of the base electrode 14, and in a reverse base current condition wherein the base current flows in a reverse direction into the base electrode 14. Where the test transistor 10 is operated in a forward base current condition, the forward base current $Ibf$ passes through the diode 26. Where test transistor 10 is operated in a reverse base current condition, the reverse base current $Ibr$ passes through the auxiliary transistor 28.

In the course of testing the test transistor 10, especially where the transistor 10 is operated at high ambient temperatures or under high power dissipation conditions, it is possible that the transistor 10 may experience thermal runaway which will result in regenerative heating and the possible destruction of the transistor 10. In the test transistor 10, thermal runaway will occur when the temperature of the emitter-base junction 12, 14 and the base-collector junction 14, 16 reaches a critical value at which the resistance of the transistor junctions begins to decrease. At the critical temperature, the total current through the test transistor 10 rapidly increases thereby increasing the temperature of the transistor 10 which in turn increases the total current through the transistor 10 and so on until the transistor 10 is destroyed. The thermal runaway phenomenon occurs so rapidly that the emitter fuse 24 does not operate fast enough in response to the general increase in emitter current $Ie$ to protect the transistor 10 from damage.

Regardless of the initial direction of the base current, as the test transistor 10 approaches thermal runaway the base current gradually increases in a reverse direction. If the test transistor 10 is initially operated in a forward base current condition, the base current will reverse direction and begin to increase as the transistor 10 approaches thermal runaway. If the test transistor 10 is initially operated in a reverse base current condition, it is operating very near to thermal runaway and a slight increase in temperature will cause it to go into thermal runaway. When the test transistor 10 actually undergoes thermal runaway, the reverse base current $Ibr$ suddenly increases at a very rapid rate. This rapid increase in the reverse base current $Ibr$ is due to an equally rapid decrease in the resistance of the base-collector junction 14, 16 as it deteriorates under the effects of regenerative heating. Since the voltage across the base-collector junction 14, 16 is much larger than the voltage across the emitter-base junction 12, 14, as is usually the case in any transistor, the reverse base current $Ibr$ flowing across the base-collector junction 14, 16 constitutes a major portion of the total current flowing through the test transistor 10 during thermal runaway.

It is primarily the reverse base current $Ibr$ which causes the regenerative heating of the transistor 10 in thermal runaway. Therefore, it has been found that the rate at which the thermal runaway phenomenon progresses can be significantly retarded by restricting the rate of increase in the reverse base current $Ibr$ of the transistor 10 during thermal runaway. In the illustrated test circuit, the auxiliary transistor 28 serves as a variable impedance device which is capable of restricting the rate of increase in the reverse base current $Ibr$ as the test transistor 10 experiences thermal runaway. Thus, the rate of thermal runaway is retarded so as to permit the emitter fuse 24 to operate before the transistor 10 is destroyed.

In order to function correctly, the auxiliary transistor 28 must be properly biased. Preferably, the auxiliary transistor 28 is biased so as to operate just slightly into saturation as the test transistor 10 begins to experience thermal runaway and the reverse base current $Ibr$ begins to rapidly increase. The desired biasing of the auxiliary transistor 28 may be accomplished through the following setup procedure.

The base electrode 14 and the collector electrode 16 of the test transistor 10 are disconnected from the test circuit and replaced by the setup resistor 38 which provides a load for the auxiliary transistor 28. Since the reverse base current $Ibr$ of the test transistor 10 passes through the auxiliary transistor 28, the collector current $Ica$ of the auxiliary transistor 28 provides a simulated reverse base current $Ibr$ for setup purposes. Ideally, the setup resistor is adjusted so that the collector current $Ica$ of the auxiliary transistor 28 is equal to the reverse base current $Ibr$ which is developed as the transistor 10 begins to experience thermal runaway. A conventional ammeter 40 connected in series with the collector electrode 16 of the auxiliary transistor 28 may be used to monitor the collector current $Ica$. Once the proper collector current $Ica$ is established, the variable biasing resistor 36 is adjusted such that the base current $Iba$ of the auxiliary transistor 28 is sufficient to operate the auxiliary transistor 28 just slightly into saturation wherein the collector-emitter voltage $Vcea$ of the auxiliary transistor 28 is substantially zero. A conventional voltmeter 42 connected in parallel between the emitter electrode 30 and the collector electrode 34 of the auxiliary transistor 28 may be used to monitor the collector-emitter voltage $Vcea$. When the collector-emitter voltage $Vcea$ decreases approximately to zero, the auxiliary transistor 28 is operating just slightly into saturation.

Figure 2:
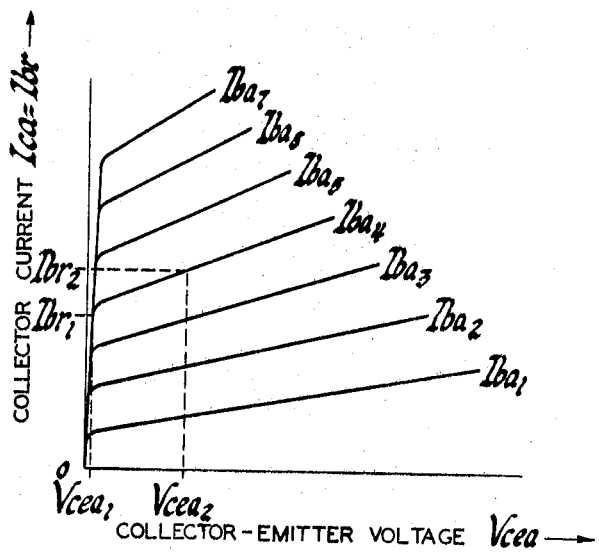
FIGURE 2 is a graph illustrating the typical output characteristics of a transistor.

This setup procedure can be more readily demonstrated by referring to FIGURE 2 which is a graph illustrating the output characteristics of a typical transistor, such as auxiliary transistor 28. The characteristic curves of the graph represent a plot of the collector current $Ica$ of the auxiliary transistor 28 versus the collector-emitter voltage $Vcea$ at several different base currents $Iba_1$–$Iba_7$. The saturation region of the auxiliary transistor 28 is approximately the region below the knee of the characteristic curves where the curves appear to converge. The active region of the auxiliary transistor 28 is approximately the region above the knee of the characteristic curves where the curves appear to diverge.

Referring to both FIGURE 1 and FIGURE 2, assume that the reverse base current $Ibr$ which is developed in the test transistor 10 as it begins to experience thermal runaway is $Ibr_1$. The setup resistor 38 is then adjusted so that the collector current $Ica$ of the auxiliary transistor 28 is equal to $Ibr_1$. Next, the biasing resistor 36 is adjusted until the base current $Iba$ of the auxiliary transistor 28 is $Iba_4$. The auxiliary transistor 28 is now operating slightly into the saturation region having a collector-emitter voltage $Vcea_1$ which is substantially zero. Since the previously established collector current $Ica$ may change somewhat as the base current $Iba$ is adjusted, it may be necessary to repeat the setup procedure several times before the desired collector current $Ica$ and the desired collector-emitter voltage $Vcea$ are obtained.

With reference to FIGURE 1, after the setup procedure is completed, the setup resistor 38 is removed from the test circuit and the base electrode 14 and the collector electrode 16 of the test transistor 10 are reconnected into the test circuit. The test transistor 10 may then be subjected to normal testing. Should thermal runaway occur during the course of testing the transistor 10, the reverse base current $Ibr$ flowing through the auxiliary transistor 28 quickly increases together with the emitter current $Ie$ and the collector current $Ic$. Since the base current $Iba$ is fixed, the auxiliary transistor 28 begins to come out of saturation as the reverse base current $Ibr$ increases above the collector current $Ica$ employed to operate the auxiliary transistor 28 just slightly into saturation during the setup procedure. As will be remembered, the collector current $Ica$ used for setup purposes was ideally equal to the reverse base current $Ibr$ developed as the test transistor 10 begins to experience thermal runaway. As the auxiliary transistor 28 comes out of saturation, it provides an impedance which increases in response to an increase in the reverse base current $Ibr$. Thus, the impedance of the auxiliary transistor 28 restricts the rate of increase in the reverse base current $Ibr$.

The operation of the auxiliary transistor 28 may best be demonstrated by referring again to FIGURE 2. Assume that the reverse base current $Ibr$ of the test transistor 10 increases to $Ibr_2$ as the result of thermal runaway. Since the base current $Iba$ of the auxiliary transistor 28 remains at $Iba_4$, the collector-emitter voltage $Vcea$ across the auxiliary transistor 28 increases sharply to $Vcea_2$ and the auxiliary transistor 28 comes out of the saturation region and goes into the active region. This rapid increase in the collector-emitter voltage $Vcea$ of the auxiliary transistor 28 is due to an equally rapid increase in the collector-emitter impedance of the auxiliary transistor 28. Thus, the auxiliary transistor 28 serves as a fast acting variable impedance device which is responsive to the increase in the reverse base current $Ibr$ caused by the thermal runaway of the transistor 10 so as to provide an impedance which restricts the rate of increase in the reverse base current $Ibr$.

As the rate of increase in the reverse base current $Ibr$ is restricted, the rate of thermal runaway of the test transistor 10 is retarded. Eventually, as the thermal runaway phenomenon progresses at the retarded rate, the emitter current $Ie$ gradually increases until the emitter fuse 24 operates to open the emitter circuit. Once the emitter circuit is opened, the emitter current $Ie$ flowing to the test transistor 10 is interrupted and the thermal runaway phenomenon is terminated. Thus, the test transistor 10 is saved from destruction.

As previously indicated, the auxiliary transistor 28 is preferably biased so as to operate just slightly into saturation at the reverse base current $Ibr$ developed as thermal runaway begins to occur in the test transistor 10. As can be appreciated, this exact value of reverse base current $Ibr$ is dependent upon the particular power dissipation characteristics of the test transistor 10 and may often be difficult to accurately ascertain. However, it is not absolutely necessary that the auxiliary transistor 28 be biased so as to come out of saturation precisely at this preferred value of reverse base current $Ibr$ in order that it function properly.

The auxiliary transistor 28 will operate satisfactorily as long as it is biased so as to operate slightly into saturation at a value of reverse base current $Ibr$ which is high enough so that the auxiliary transistor 28 will not restrict the reverse base current $Ibr$ developed during the normal testing of the transistor 10, but low enough so that the auxiliary transistor 28 will adequately restrict the rate of increase in the reverse base current $Ibr$ developed as the transistor 10 experiences thermal runaway. Generally, the auxiliary transistor 28 should be biased so as to operate slightly into saturation when the reverse base current $Ibr$ passing through it is a predetermined value which is within a range extending from the maximum reverse base current $Ibr$ developed when the test transistor 10 is operated in the reverse base current condition during normal testing to the reverse base current $Ibr$ developed when the transistor 10 begins to experience thermal runaway. When biased so as to operate slightly into saturation at a reverse base current $Ibr$ within the specified range, the auxiliary transistor 28 will function to adequately restrict the rate of increase in the reverse base current $Ibr$ when thermal runaway occurs but will not interfere with the flow of reverse base current $Ibr$ during normal testing. Thus, the necessity of determining the exact reverse base current $Ibr$ developed as the test transistor 10 begins to experience thermal runaway is obviated. A suitable value of reverse base current $Ibr$ from within the specified range can be easily selected.

The test circuit illustrated in FIGURE 1 may be used in conducting a variety of transistor tests. For example, the specifications for conducting a typical transistor life test utilizing the illustrated test circuit are as follows:

COMPONENTS (1) Test transistor 10—Delco radio 2N1100, PNP, 15 amperes (high power transistor)
(2) Auxiliary transistor 28—Delco radio 2N3212, PNP, 5 amperes (medium power transistor)
(3) Diode 26—Delco radio DRS102, 200 volts, 1 ampere
(4) Emitter voltage source 18—6 volts
(5) Emitter resistor 20—10 ohms
(6) Emitter fuse 24—2 amperes
(7) Collector voltage source 22—0–60 volts
(8) Biasing resistor 36—250 ohms
(9) Setup resistor 38—3000 ohms

PROCEDURE (1) Set collector voltage source 22 so as to yield an output of 40 volts.

(2) Adjust emitter resistor 20 with respect to emitter voltage source 18 so as to yield an emitter current $Ie$ which will cause the test transistor 10 to operate into saturation with forward base current $Ibf$.

(3) Adjust setup resistor 38 so as to yield a collector current $Ica$ of approximately 2 amperes through auxiliary transistor 28.

(4) Adjust biasing resistor 36 so as to yield a base current $Iba$ which will cause the auxiliary transistor 28 to operate slightly into saturation at the established 2 amperes collector current $Ica$.

(5) Operate test transistor 10 continuously for 1000 hours, recording vital characteristics at intervals of 0, 250, 500, and 1000 hours.

It is a principal advantage of the illustrated test circuit that the test transistor is saved from destruction and may be inspected so as to ascertain the exact cause of failure. In this manner, appropriate measures can be taken in the future to remedy the defect which caused the failure. This advantage is realized because the effectiveness of the inventive test circuit is not solely dependent upon the operating time of a fuse or other conventional circuit breaker. It is another advantage of the illustrated test circuit that the test transistor is protected from thermal runaway without affecting the normal operation of the test circuit.

I claim:

1. A circuit for protecting a transistor having emitter, base, and collector electrodes from damage due to thermal runaway, comprising: a circuit breaker coupled to one of the electrodes for passing electrode current therethrough, the circuit breaker being responsive to the increase in electrode current caused by the thermal runaway of the transistor so as to open the electrode circuit but being too slow acting to prevent damage to the transistor before the electrode circuit is opened; and variable impedance means coupled to the base electrode for passing reverse base current therethrough, the variable impedance means being responsive to the increase in reverse base current caused by the thermal runaway of the transistor so as to provide an impedance which increases as the reverse base current increases thereby restricting the rate of increase in the reverse base current so as to permit the circuit breaker to open the electrode circuit and terminate the thermal runaway before the transistor is damaged.

2. A circuit for protecting a transistor having emitter, base, and collector electrodes from damage due to thermal runaway, comprising: a fuse coupled to one of the electrodes for passing electrode current therethrough, the fuse being responsive to the increase in electrode current caused by the thermal runaway of the transistor so as to open the electrode circuit but being too slow acting to prevent damage to the transistor before the electrode circuit is opened; and an auxiliary transistor coupled to the base electrode circuit for passing reverse base current therethrough, the auxiliary transistor being biased so as to provide an impedance which increases in response to the increase in the reverse base current caused by the thermal runaway of the transistor, the impedance of the auxiliary transistor thereby restricting the rate of increase in the reverse base current so as to permit the fuse to open the electrode circuit and terminate the thermal runaway before the transistor is damaged.

3. A circuit for protecting a transistor having base, emitter, and collector electrodes from damage due to thermal runaway, comprising: a circuit breaker coupled to one of the electrodes for passing electrode current therethrough, the circuit breaker being responsive to the increase in electrode current caused by the thermal runaway of the transistor so as to open the electrode circuit but being too slow acting to prevent damage to the transistor before the electrode circuit is opened; undirectionally conducting means coupled to the base electrode for passing forward base current therethrough; and variable impedance means coupled to the base electrode for passing reverse base current therethrough, the variable impedance means providing an impedance which is a minimum when the reverse base current is below a predetermined value and which increases toward a maximum as the reverse base current increases above the predetermined value, the predetermined value being within a range extending from the maximum reverse base current developed as the transistor is normally operated to the reverse base current developed as the transistor begins to experience thermal runaway, the impedance of the variable impedance means thereby restricting the rate of increase in the reverse base current so as to permit the circuit breaker to open the electrode circuit and terminate the thermal runaway before the transistor is damaged.

4. A circuit for protecting a transistor having base, emitter, and collector electrodes from damage due to thermal runaway, comprising: a fuse coupled to one of the electrodes for passing electrode current therethrough, the fuse being responsive to the increase in electrode current caused by the thermal runaway of the transistor so as to open the electrode circuit but being too slow acting to prevent damage to the transistor before the electrode circuit is opened; a diode coupled to the base electrode for passing forward base current therethrough; and an auxiliary transistor coupled to the base electrode for passing reverse base current therethrough, the auxiliary transistor being biased so as to provide an impedance which is a minimum when the reverse base current is below a predetermined value and which increases toward a maximum as the reverse base current increases above the predetermined value, the predetermined value being within a range extending from the maximum reverse base current developed as the transistor is normally operated to the reverse base current developed as the transistor begins to experience thermal runaway, the impedance of the auxiliary transistor thereby restricting the rate of increase in the reverse base current so as to permit the fuse to open the electrode circuit and terminate the thermal runaway before the transistor is damaged.

5. A circuit for protecting a transistor having base, emitter, and collector electrodes from damage due to thermal runaway, comprising: a fuse coupled to one of the electrodes for passing electrode current therethrough, the fuse being responsive to the increase in electrode current caused by the thermal runaway of the transistor so as to open the electrode circuit but being too slow acting to prevent damage to the transistor before the electrode circuit is opened; a diode coupled to the base electrode for passing forward base current therethrough; and an auxiliary transistor coupled to the base electrode for passing reverse base current therethrough, the auxiliary transistor being biased so as to operate slightly into saturation at a predetermined value of reverse base current so that as the reverse base current increases above the predetermined value the auxiliary transistor comes out of saturation and provides an impedance which increases as the reverse base current increases, the predetermined value being within a range extending from the maximum reverse base current developed as the transistor is operated during normal testing to the reverse base current developed as the transistor begins to experience thermal runaway, the impedance of the auxiliary transistor thereby restricting the rate of increase in the reverse base current so as to permit the fuse to open the electrode circuit and terminate the thermal runaway before the transistor is damaged.

6. A transistor test circuit for protecting a test transistor having base, emitter, and collector electrodes from damage due to thermal runaway, comprising: current supply means coupled to the emitter electrode for supplying emitter current to the test transistor; voltage supply means coupled to the collector electrode for supplying collector voltage to the test transistor; a fuse coupled to one of the electrodes for passing electrode current therethrough, the fuse being responsive to the increase in electrode current caused by the thermal runaway of the test transistor so as to open the electrode circuit but being too slow acting to prevent damage to the transistor before the electrode circuit is opened; a diode coupled to the base electrode circuit for passing forward base current therethrough; and an auxiliary transistor coupled to the base electrode for passing reverse base current therethrough, the auxiliary transistor being biased so as to operate slightly into saturation at a predetermined value of reverse base current so that as the reverse base current increases above the predetermined value the auxiliary transistor comes out of saturation and provides an impedance which increases as the reverse base current increases, the predetermined value being within a range extending from the maximum reverse base current developed as the test transistor is operated during normal testing to the reverse base current developed as the test transistor begins to experience thermal runaway, the impedance of the auxiliary transistor thereby restricting the rate of increase in the reverse base current so as to permit the fuse to open the electrode circuit and terminate the thermal runaway before the test transistor is damaged.

References Cited

UNITED STATES PATENTS

| | | | |
|---|---|---|---|
| 3,054,954 | 9/1962 | Boscia | 324—158 |
| 3,215,896 | 11/1965 | Shattuck | 307—202 XR |
| 3,359,434 | 12/1967 | Galluzzi | 307—202 |
| 3,401,338 | 9/1968 | Bolvin | 324—158 |

RUDOLPH V. ROLINEC, Primary Examiner

E. L. STOLRUN, Assistant Examiner

U.S. Cl. X.R.

307—202; 317—33; 323—9; 340—250